US007254341B2

(12) United States Patent
Islam et al.

(10) Patent No.: US 7,254,341 B2
(45) Date of Patent: *Aug. 7, 2007

(54) SYSTEM AND METHOD FOR DISPERSION COMPENSATION IN AN OPTICAL COMMUNICATION SYSTEM

(75) Inventors: Mohammed N. Islam, Allen, TX (US); Amos Kuditcher, Allen, TX (US)

(73) Assignee: Xtera Communications, Inc., Allen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/277,462

(22) Filed: Mar. 24, 2006

(65) Prior Publication Data

US 2006/0188263 A1     Aug. 24, 2006

Related U.S. Application Data

(63) Continuation of application No. 10/100,589, filed on Mar. 15, 2002, now Pat. No. 7,058,311.

(51) Int. Cl.
*H04B 10/00*     (2006.01)
(52) U.S. Cl. ..................................... 398/140
(58) Field of Classification Search ......... 398/140–214
See application file for complete search history.

(56) References Cited

U.S. PATENT DOCUMENTS 3,772,528 A     11/1973     Anderson ............... 307/88.3

(Continued)

FOREIGN PATENT DOCUMENTS

EP     0 903 877 A2     3/1999

(Continued)

OTHER PUBLICATIONS

Hansen et al., "Repeaterless transmission experiment employing dispersion," 21st European Conference on Optical Communication, vol. 2, 1 page, Sep. 17-21, 1995.

(Continued)

*Primary Examiner*—Jason Chan
*Assistant Examiner*—David Lee
(74) *Attorney, Agent, or Firm*—Baker Botts L.L.P.

(57) ABSTRACT

An optical communication system includes a first end terminal comprising a first transponder operable to receive a first electrical signal and generate an optical signal based at least in part on the first electrical signal for communication to a multiple span communication link. The optical signal experiences at least partial dispersion compensation from an optical dispersion compensating element as it traverses the communication link. The system also includes a second end terminal comprising a second transponder operable to receive the optical signal and generate a second electrical signal based at least in part on the optical signal. At least one of the first and second end terminals further includes an electronic dispersion compensation module operable to provide electronic dispersion compensation to at least a portion of at least one of the first and second electrical signals. The electronic dispersion compensation module is operable to at least partially compensate for at least a portion of a residual dispersion for which the optical dispersion compensating element does not compensate.

20 Claims, 3 Drawing Sheets

U.S. PATENT DOCUMENTS

| | | | | |
|---|---|---|---|---|
| 4,616,898 A | 10/1986 | Hicks, Jr. | | 350/96.15 |
| 4,700,339 A | 10/1987 | Gordon et al. | | 370/3 |
| 4,932,739 A | 6/1990 | Islam | | 350/96.15 |
| 4,995,690 A | 2/1991 | Islam | | 350/96.15 |
| 5,020,050 A | 5/1991 | Islam | | 370/4 |
| 5,078,464 A | 1/1992 | Islam | | 385/122 |
| 5,101,456 A | 3/1992 | Islam | | 385/27 |
| 5,115,488 A | 5/1992 | Islam et al. | | 385/129 |
| 5,184,243 A | 2/1993 | Henmi et al. | | 359/181 |
| 5,224,194 A | 6/1993 | Islam | | 385/122 |
| 5,369,519 A | 11/1994 | Islam | | 359/173 |
| 5,430,568 A | 7/1995 | Little et al. | | 359/124 |
| 5,485,536 A | 1/1996 | Islam | | 385/31 |
| 5,557,442 A | 9/1996 | Huber | | 359/179 |
| 5,559,920 A | 9/1996 | Chraplyvy et al. | | 385/123 |
| 5,608,561 A | 3/1997 | Marcuse et al. | | 359/161 |
| 5,623,508 A | 4/1997 | Grubb et al. | | 372/3 |
| 5,629,795 A | 5/1997 | Suzuki et al. | | 359/337 |
| 5,642,215 A | 6/1997 | Suzuki et al. | | 359/161 |
| 5,664,036 A | 9/1997 | Islam | | 385/31 |
| 5,673,280 A | 9/1997 | Grubb et al. | | 372/3 |
| 5,778,014 A | 7/1998 | Islam | | 372/6 |
| 5,784,184 A | 7/1998 | Alexander et al. | | 359/125 |
| 5,796,909 A | 8/1998 | Islam | | 385/147 |
| 5,798,853 A | 8/1998 | Watanabe | | 359/160 |
| 5,815,518 A | 9/1998 | Reed et al. | | 372/6 |
| 5,828,478 A | 10/1998 | Thomine et al. | | 359/161 |
| 5,872,647 A | 2/1999 | Taga et al. | | 359/184 |
| 5,887,093 A | 3/1999 | Hansen et al. | | 385/27 |
| 5,905,838 A | 5/1999 | Judy et al. | | 385/123 |
| 5,953,138 A | 9/1999 | Ellis | | 359/123 |
| 5,959,750 A | 9/1999 | Eskildsen et al. | | 359/134 |
| 5,978,130 A | 11/1999 | Fee et al. | | 359/341 |
| 5,999,289 A | 12/1999 | Ihara et al. | | 359/124 |
| 6,005,702 A | 12/1999 | Suzuki et al. | | 359/183 |
| 6,043,927 A | 3/2000 | Islam | | 359/332 |
| 6,052,393 A | 4/2000 | Islam | | 372/6 |
| 6,067,180 A | 5/2000 | Roberts | | 359/181 |
| 6,081,360 A | 6/2000 | Ishikawa et al. | | 359/161 |
| 6,081,366 A | 6/2000 | Kidorf et al. | | 359/341 |
| 6,097,524 A | 8/2000 | Doran et al. | | 359/179 |
| 6,101,024 A | 8/2000 | Islam et al. | | 359/334 |
| 6,115,173 A | 9/2000 | Tanaka et al. | | 359/333 |
| 6,118,566 A | 9/2000 | Price | | 359/181 |
| 6,141,127 A | 10/2000 | Boivin et al. | | 359/124 |
| 6,151,160 A | 11/2000 | Ma et al. | | 359/341 |
| 6,163,394 A | 12/2000 | Webb | | 359/181 |
| 6,181,449 B1 | 1/2001 | Taga et al. | | 359/124 |
| 6,191,854 B1 | 2/2001 | Grasso et al. | | 356/341 |
| 6,204,949 B1 | 3/2001 | Ishikawa et al. | | 359/161 |
| 6,229,937 B1 | 5/2001 | Nolan et al. | | 385/24 |
| 6,236,488 B1 | 5/2001 | Shimizu et al. | | 359/187 |
| 6,239,902 B1 | 5/2001 | Islam et al. | | 359/334 |
| 6,239,903 B1 | 5/2001 | Islam et al. | | 359/337 |
| 6,246,498 B1 | 6/2001 | Dishman et al. | | 359/123 |
| 6,252,692 B1 | 6/2001 | Roberts | | 359/173 |
| 6,252,700 B1 | 6/2001 | Hwang et al. | | 359/337 |
| 6,310,716 B1 | 10/2001 | Evans et al. | | 359/334 |
| 6,317,239 B1 | 11/2001 | Burbidge et al. | | 359/161 |
| 6,335,820 B1 | 1/2002 | Islam | | 359/334 |
| 6,356,384 B1 | 3/2002 | Islam | | 359/334 |
| 6,359,725 B1 | 3/2002 | Islam | | 359/334 |
| 6,370,164 B1 | 4/2002 | Islam | | 372/6 |
| 6,374,006 B1 | 4/2002 | Islam et al. | | 385/15 |
| 6,381,391 B1 | 4/2002 | Islam et al. | | 385/123 |
| 6,529,305 B1 | 3/2003 | Meeker et al. | | 359/161 |
| 6,580,548 B2 | 6/2003 | Islam | | 359/334 |
| 6,603,594 B2 | 8/2003 | Islam | | 359/334 |
| 6,654,564 B1 | 11/2003 | Colbourne et al. | | 398/147 |
| 6,693,737 B2 | 2/2004 | Islam | | 359/334 |
| 6,693,738 B2 | 2/2004 | Islam | | 359/334 |
| 6,694,273 B2 * | 2/2004 | Kurooka et al. | | 702/69 |
| 6,731,877 B1 | 5/2004 | Cao | | 398/91 |
| 6,778,321 B1 | 8/2004 | Islam | | 359/334 |
| 6,819,478 B1 | 11/2004 | Islam | | 359/334 |
| 6,885,498 B2 | 4/2005 | Islam | | 359/334 |
| 6,954,303 B2 | 10/2005 | Islam | | 359/334 |
| 7,058,311 B1 * | 6/2006 | Islam et al. | | 398/140 |
| 2002/0039217 A1 | 4/2002 | Saunders et al. | | 359/161 |
| 2005/0041974 A1 | 2/2005 | Novak et al. | | 398/81 |

FOREIGN PATENT DOCUMENTS

| | | |
|---|---|---|
| WO | 98/36479 | 8/1998 |
| WO | 98/42088 | 9/1998 |
| WO | 99/66607 | 12/1999 |

OTHER PUBLICATIONS

Baney et al., "WDM EDFA Gain Characterization with a Reduced Set of Saturating Channels," IEEE Photonics Technology Letters, vol. 8, No. 12, pp. 1615-1617, Dec. 1996.

Goel et al., "Wide-Band Dispersion Compensating Optical Fiber," IEEE Photonics Technology Letters, vol. 8, No. 12, pp. 1668-1670, Dec. 1998.

Masuda et al., "Ultra-wideband optical amplification with 3dB bandwidth of 65 nm using a gain-equalised two-stage erbium-doped fibre amplifier and Raman amplification," Electronics Letters, vol. 33, No. 9, pp. 73-78, Feb. 24, 1997.

Kawai et al., "Ultrawide, 75nm 3-dB gain-band optical amplifier utilizing erbium-doped fluoride fiber and Raman fiber," Tuesday Afternoon, OFC Technical Digest, TuG3, pp. 32-33, 1998.

Rotwitt et al., "Distributed Raman Amplifiers for Long Haul Transmission Systems," IEEE, pp. 251-252, 1998.

Hansen et al.; "Loss compensation in dispersion compensating fiber modules by Raman amplification," Optical Fiber Conference OFC'98, Technical Digest TuD1, pp. 20-21, 1998.

Hansen et al., "529 km Unrepeatered Transmission at 2.488 Gbit/s Using Dispersion Compensation, Forward Error Correction, and Remote Post-and Pre-amplifiers Pumped by Diode-Pumped Raman Lasers," IEEE Electronics Letters, Online No. 19951043, Jul. 7, 1998.

Becker et al., "Erbium Doped Fiber Amplifiers Fundamentals and Technology," Academic Press, pp. 55-60 plus title and copyright page, 1999.

Masuda et al., "Wide-Band and Gain-Flattened Hybrid Fiber Amplifier Consisting of an EDFA and a Multiwavelength Pumped Raman Amplifier," IEEE Photonics Technology Letters, vol. 11, No. 6, pp. 647-649, Aug. 1999.

Suzuki et al., "50 GHz spaced, 32 x 10 Gbit/s dense WDM transmission in zero-dispersion region over 640km of dispersion-shifted fibre with multiwavelength distributed Raman amplification," Electronics Letters, vol. 35, No. 14, pp. 1175-1176, Jul. 8, 1999.

Yun et al., "Dynamic Erbium-Doped Fiber Amplifier Based on Active Gain Flattening with Fiber Acoustooptic Tunable Filters," IEEE Photonics Technology Letters, vol. 11, No. 10, pp. 1229-1231, Oct. 1999.

Otte et al., Performance of Electronic Compensator for Chromatic Dispersion & SPM, ECOC 3.2.4, 2 pages, 2000.

Bülow et al., "Electronically Enhanced Optical PMD Compensation," ECOC 4.2.4, 2 pages, 2000.

Witte et al., "Reducing the optical power penalty for electronically dispersion compensated LED pulse transmission by using multi-bit shift decision feedback," Electronics Letters, vol. 36, No. 5, 2 pages, Mar. 2, 2000.

Nielsen et al., "3.28 Tb/s (82/spl times 40 Gb/s) transmission over 3/spl times 100 km nonzero-dispersion fiber using dual C- and L-band hybrid Raman/erbium-doped inline amplifiers," OFCC 2000, pp. 236-238 plus internet title page, Mar. 7-10, 2000.

Cariali et al., "Electronic compensation of PMD and chromatic dispersion with an IC in 10 Gbit/s transmission system," Electronics Letters, vol. 36, No. 10, May 11, 2000.

Cravotta, "DWDM: feeding our insatiable appetite for bandwidth (Technology Information)," FindArticles.com, http://www.findarticles.com, 8 pages, Sep. 1, 2000.

Tomkos et al. "Demonstration of Negative Dispersion Fibers for DWDM Metropolitan Area Networks," IEEE Journal on Selected Topics in Quantum Electronics, vol. 7, No. 3, pp. 439-460, May 2001.

Optical Society of America, Optical Amplifiers and Their Applications, Technical Digest, entitled "Raman amplification and dispersion-managed solitons for all-optical, ultra-long-haul, dense WDM.", Jul. 1-4, 2001.

Woodfin et al. "Negative-dispersion fiber in metropolitan networks," Lightwave, 8 pages, Jan. 2002.

Emori et al., OSA Topical Meeting on Optical Amplifiers and Their Applications OAA'98, postdeadline paper PD3, Vail, CO.

Nissov et al., "100 Gb/s (10x10Gb/s) WDM Transmission Over 7200 km Using Distributed Raman Amplification," pp. 9-12.

Tashiro et al., "1.5 W Erbium Doped Fiber Amplifier Pumped by the Wavelength Division-Multiplexed 1480 nm Laser Diodes with Fiber Bragg Grating," Optical Transmission Systems Group, paper WC2-1-3, pp. 213-213.

Pending U.S. Appl. No. 10/100,588; entitled "Electro-Absorption Based Modulation," by Herve A Fevricet et al., filed Mar. 15, 2002.

Pending U.S. Appl. No. 10/100,591; entitled "System and Method for Managing System Margin," by Mohammed N. Islam et al., filed Mar. 15, 2002.

Pending U.S. Appl. No. 10/100,700; entitled "Rack System for an End Terminal in an Optical Communication Network," by Mohammed N. Islam et al., filed Mar. 15, 2002.

* cited by examiner

SYSTEM AND METHOD FOR DISPERSION COMPENSATION IN AN OPTICAL COMMUNICATION SYSTEM

CROSS-REFERENCE TO RELATED APPLICATIONS

This Application claims priority to U.S. application Ser. No. 10/100,589 filed Mar. 15, 2002 now U.S. Pat. No. 7,058,311, and entitled System and Method for Dispersion Compensation in an Optical Communication System.

TECHNICAL FIELD

This invention relates generally to the field of communication systems, and more particularly to a system and method for dispersion compensation in an optical communication system.

Overview

A transmitting terminal in an optical communication system typically communicates with a receiving terminal by modulating data onto optical signals. The transmitting terminal may then communicate the optical signals to the receiving terminal over one or more spans of optical fiber. Each span of optical fiber may extend for distances of, for example, eighty kilometers or more. The optical signals communicated over the optical fiber may include multiple channels, where different channels carry data at different wavelengths. As the optical signals travel along the spans of optical fiber, the optical signals often suffer from various types of dispersion. For example, chromatic dispersion may occur when signals having different wavelengths travel at different speeds along the optical fiber. Because of this dispersion, the signal can experience pulse broadening, which may lead to inter-symbol interference and a degradation in the Q-factor of the system.

SUMMARY OF EXAMPLE EMBODIMENTS

The present invention recognizes a need for an improved system and method for dispersion compensation in an optical communication system, which reduce or eliminate at least some of the problems and disadvantages associated with prior systems and methods.

In one embodiment, an optical communication system includes a transponder operable to receive an electrical signal and to generate, based at least in part on the electrical signal, an optical signal for communication to a multiple span communication link. The optical signal experiences at least partial dispersion compensation from an optical dispersion compensating element as it traverses the communication link. The system also includes an electronic dispersion compensation module coupled to the transponder and operable to provide electronic dispersion compensation to at least a portion of the electrical signal to at least partially compensate for at least a portion of a residual dispersion for which the optical dispersion compensating element does not compensate.

In another embodiment, an optical communication system includes a transponder operable to receive from a multiple span communication link an optical signal. The optical signal experiences at least partial dispersion compensation from an optical dispersion compensating element as it traverses the communication link. The transponder is operable to convert the optical signal into an electrical signal. The system also includes an electronic dispersion compensation module coupled to the transponder and operable to provide electronic dispersion compensation to at least a portion of the electrical signal to at least partially compensate for at least a portion of a residual dispersion for which the optical dispersion compensating element did not compensate.

In yet another embodiment, an optical communication system includes a transponder operable to receive from a multiple span communication link an optical signal. The optical signal experiences dispersion compensation from an optical dispersion compensating element as it traverses the communication link. The transponder is operable to convert the optical signal into an electrical signal. The system also includes a controller coupled to the transponder. The controller is operable to measure a residual dispersion for which the optical dispersion compensating element does not compensate and generate, based at least in part on the measured residual dispersion, one or more feedback signals for communication to a transmitting terminal that generated the optical signal received. The feedback signal facilitates electronic dispersion compensation at the transmitting terminal to at least partially compensate for the residual dispersion.

In still another embodiment, an optical communication system includes a first end terminal comprising a first transponder operable to receive a first electrical signal and generate an optical signal based at least in part on the first electrical signal for communication to a multiple span communication link. The optical signal experiences at least partial dispersion compensation from an optical dispersion compensating element as it traverses the communication link. The system also includes a second end terminal comprising a second transponder operable to receive the optical signal and generate a second electrical signal based at least in part on the optical signal. At least one of the first and second end terminals further includes an electronic dispersion compensation module operable to provide electronic dispersion compensation to at least a portion of at least one of the first and second electrical signals. The electronic dispersion compensation module is operable to at least partially compensate for at least a portion of a residual dispersion for which the optical dispersion compensating element does not compensate.

In yet another embodiment, an optical communication system includes an optical dispersion compensation element operable to receive from a communication link having a first dispersion slope comprising a function of wavelength a multiple wavelength optical signal comprising a plurality of wavelengths. The dispersion compensation element has a second slope, wherein the magnitudes of the first and second dispersion slopes differ for at least two of the plurality of wavelengths, resulting in a residual dispersion not compensated by the dispersion compensating element. The system also includes an electronic dispersion compensation module operable to provide electronic dispersion compensation to at least partially compensate for the residual dispersion.

In a method embodiment, a method of communicating optical signals includes converting an electrical signal into an optical signal and communicating the optical signal to a multiple span communication link. The optical signal experiences at least partial dispersion compensation from an optical dispersion compensating element as it traverses the communication link. The method also includes providing electronic dispersion compensation to at least a portion of the electrical signal to at least partially compensate for at least a portion of a residual dispersion for which the optical dispersion compensating element does not compensate.

In another method embodiment, a method of communicating optical signals includes receiving an optical signal from a multiple span communication link. The optical signal experiences at least partial dispersion compensation from an optical dispersion compensating element as it traverses the communication link. The method also includes converting the optical signal into an electrical signal and providing electronic dispersion compensation to at least a portion of the electrical signal to at least partially compensate for at least a portion of a residual dispersion for which the optical dispersion compensating element does not compensate.

In yet another method embodiment, a method of communicating optical signals includes receiving an optical signal from a multiple span communication link. The optical signal experiences at least partial dispersion compensation from an optical dispersion compensating element as they traverse the communication link. The method also includes converting the optical signal into an output electrical signal and generating a feedback signal based at least in part on a residual dispersion associated with at least one of the optical signal and the output electrical signal. The method further includes communicating the feedback signal to a transmitting terminal operable to use the feedback signal to provide electronic dispersion compensation to at least a portion of an input electrical signal used to generate the optical signal for communication over the communication link. The electronic dispersion compensation at least partially compensates for the residual dispersion.

In still another method embodiment, a method of communicating optical signals includes providing optical dispersion compensation to a multiple wavelength signal. The multiple wavelength signal is communicated over a communication link, which is associated with a first slope of dispersion and imparts a different amount of dispersion to at least two wavelengths in the multiple wavelength signal. The optical dispersion compensation is associated with a second slope of dispersion and imparts a different amount of compensation to at least two wavelengths in the multiple wavelength signal. A magnitude of the first slope of dispersion for at least one of the wavelengths does not completely match a magnitude of the second slope of dispersion which results in a residual dispersion. The method also includes providing electronic dispersion compensation to at least partially compensate for the residual dispersion.

Numerous technical advantages are provided according to various embodiments of the present invention. Particular embodiments of the invention may exhibit none, some, or all of the following advantages depending on the implementation. For example, in one embodiment, a system for dispersion compensation is provided. In particular, the system may include a first terminal that communicates with a second terminal using optical signals sent over an optical communication link. The optical signals may suffer from dispersion when traveling between the terminals, and the system may perform different types of dispersion compensation at one or more points in the system. For example, the system may perform optical dispersion compensation at one or more points along the communication link and/or at one or more of the terminals. Optical dispersion compensation may involve processing and altering the optical signals to reduce the effect of the dispersion. The system may also perform electronic dispersion compensation at one or more of the terminals. Electronic dispersion compensation may involve processing and altering electrical signals, such as the electronic signals used to produce the optical signal at the first terminal and/or the electronic signals recovered from the optical signals received at the second terminal. By performing different types of dispersion compensation at one or more points in the system, the system may more effectively facilitate communication between terminals. The system may also reduce inter-symbol interference due to pulse broadening and increase the Q-factor of the system.

Another advantage of at least some embodiments of the invention is that the system may dynamically correct dispersion of the optical signals. For example, the dispersion of the optical signals may vary depending on the temperature of the optical fiber, the types of optical fiber used in the communication system, and the lengths of the optical fibers. In some embodiments, the system may monitor the dispersion suffered by the optical signals and partially or substantially correct the dispersion, even when the dispersion varies over time. This allows the system to further reduce inter-symbol interference due to pulse broadening and increase the Q factor of the system.

Other technical advantages are readily apparent to one of skill in the art from the attached figures, description, and claims.

BRIEF DESCRIPTION OF THE DRAWINGS

To provide a more complete understanding of the present invention and features and advantages thereof, reference is made to the following description in conjunction with the accompanying drawings, in which.

DETAILED DESCRIPTION OF EXAMPLE EMBODIMENTS

Figure 1:
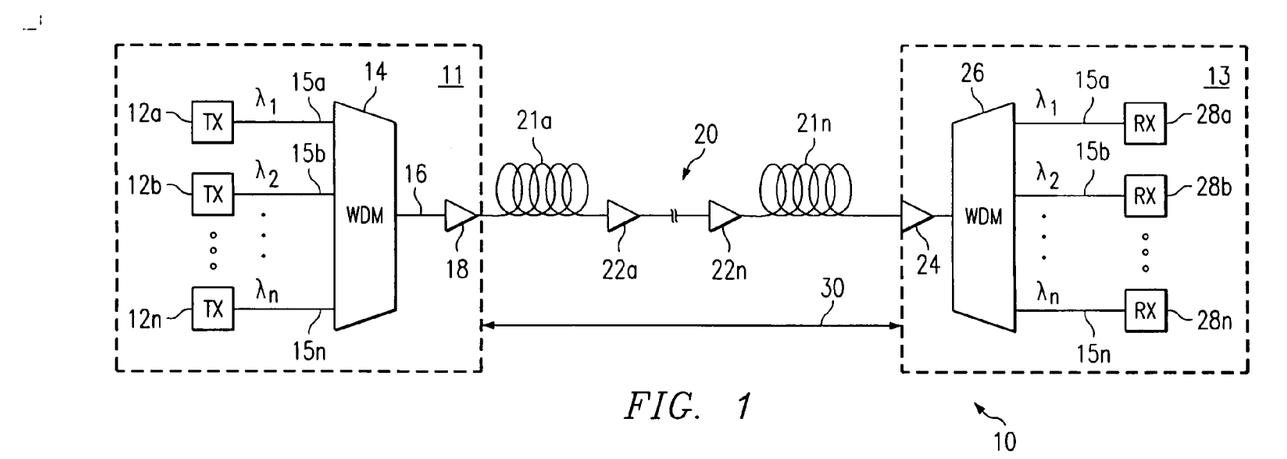
FIG. 1 is a block diagram illustrating at least a portion of an example system for dispersion compensation.

FIG. 1 is a block diagram illustrating at least a portion of an example system 10 for dispersion compensation. In the illustrated embodiment, system 10 includes a first terminal 11, a second terminal 13, and an optical communication medium 20. Other embodiments of system 10 may be used without departing from the scope of this disclosure. In some embodiments, system 10 may comprise the entire optical communication system from beginning to end. In other embodiments, system 10 may comprise a portion of a larger optical communication system. In those embodiments, terminals 11 and 13 could comprise optical regenerators residing within a larger, multiple link communication system.

In the illustrated embodiment, terminal 11 includes one or more transponders 12a-12n (referred to collectively as transponders 12), a combiner 14, and a booster amplifier 18. Terminal 13 includes a preamplifier 24, a separator 26, and one or more transponders 28a-28n (referred to collectively as transponders 28). Other embodiments of terminals 11 and/or 13 may be used without departing from the scope of this disclosure. For example, while FIG. 1 shows booster amplifier 18 residing in terminal 11 and preamplifier 24 residing in terminal 13, one or both amplifiers could reside outside of the terminals. Similarly, while FIG. 1 shows combiner 14 residing in terminal 11 and separator 26 residing in terminal 13, one or both could reside outside of the terminals.

Transponders 12 are coupled to combiner 14, and transponders 28 are coupled to separator 26. In this document, the term "couple" may refer to any direct or indirect communication between two or more elements, whether or not those elements are in physical contact with one another. Also, in this document, the terms "communication" and "communicate" may refer to a direct transfer of information between two components or an indirect transfer of information between two components through one or more intervening components. Transponders 12 and 28 may represent transmitters and/or receivers operable to communicate and/or receive a plurality of optical signals (or channels) 15a-15n (referred to collectively as optical signals 15). For example, a transponder 12 or 28 could represent a transmitter operable to receive an electrical signal and convert the electrical signal into an optical signal 15 for communication over communication medium 20. A transponder 12 or 28 could also represent a receiver operable to receive an optical signal 15 over communication medium 20 and convert the optical signal 15 into an electrical signal. In addition, a transponder 12 or 28 could represent both a transmitter and a receiver. For example, the transmitter in a transponder 12 or 28 could receive electrical signals from the receiver in the transponder 12 or 28 and generate an optical signal 15, such as when transponder 12 or 28 serves as an optical regenerator residing within a multiple link communication system.

Although, for ease of description, transponders 12 may be further described at various points in this document as representing transmitters, transponders 12 could also represent receivers and/or combinations of transmitters and receivers. Similarly, although, for ease of description, transponders 28 may be further described at various points in this document as representing receivers, transponders 28 could also represent transmitters and/or combinations of transmitters and receivers. In addition, while system 10 may be described as allowing unidirectional communication from terminal 11 to terminal 13, in various embodiments system 10 could also support bi-directional communication between terminals 11 and 13.

In one embodiment, transponders 12 in system 10 comprise transmitters capable of converting electrical signals into optical wavelengths, and transponders 28 comprise receivers capable of converting the optical wavelengths into electrical signals. Transponders 12 may receive electrical signals generated by any suitable device, such as source devices initiating communications or from other electrical networks coupled to transponder 12. In a particular embodiment, transponders 12 may generate optical signals 15 and transponders 28 may receive optical signals 15, where each signal 15 comprises a center wavelength (X) of light. In some embodiments, each optical signal 15 can comprise a center wavelength that is substantially different from the center wavelengths of other signals 15. In this document, the phrase "center wavelength" may refer to a time-averaged mean of the spectral distribution of an optical signal. The spectrum surrounding the center wavelength need not be symmetric about the center wavelength. Moreover, there is no requirement that the center wavelength represent a carrier wavelength.

In one embodiment, transponders 12 and/or 28 comprise a plurality of independent pairs of optical sources and associated modulators. In another embodiment, transponders 12 and/or 28 could comprise one or more optical sources capable of generating a plurality of optical signals and shared by a plurality of modulators. For example, transponders 12 and/or 28 could comprise a continuum source transmitter including a modelocked source operable to generate a series of optical pulses and a continuum generator operable to receive a train of pulses from the modelocked source and to spectrally broaden the pulses to form an approximate spectral continuum of optical signals. In that embodiment, a signal splitter receives the continuum and separates the continuum into individual signals each having a center wavelength. In some embodiments, transponders 12 and/or 28 can also include a pulse rate multiplexer, such as a time division multiplexer, operable to multiplex pulses received from the mode locked source or the modulator to increase the bit rate of the system.

In a particular embodiment, a transponder 12 and/or 28 may comprise an electro-absorption modulated laser (EML). In this embodiment, the EML comprises a laser diode and an electro-absorption modulator (EAM) located on a common substrate. Locating the laser diode and the EAM on a common substrate is advantageous in allowing relatively inexpensive packaging of EMLs by facilitating formation of arrays of EMLs. In another embodiment, transponder 12 and/or 28 may comprise an EML with forward error correction (FEC) capabilities. Using an FEC technique in system 10 provides an advantage of improving the tolerance of system 10 to errors in optical signal 15. Transponder 12 and/or 28 could further comprise other optical sources and/or receivers, such as externally modulated light sources.

Combiner 14 is coupled to transponders 12 and booster amplifier 18. Combiner 14 is operable to receive a plurality of optical signals 15 and to combine those signals into a multiple wavelength signal 16. As a particular example, combiner 14 could comprise a wavelength division multiplexer (WDM). In one embodiment, the wavelength division multiplexer may include equipment operable to process wavelength division multiplexed signals and/or equipment operable to process dense wavelength division multiplexed signals.

System 10 communicates multiple wavelength signal 16 over optical communication medium 20. Communication medium 20 can comprise a plurality of spans 21a-21n of fiber, each coupled to or comprising an in-line optical amplifier 22. In some embodiments, all or a portion of a span 21 can serve as a distributed amplification stage. Fiber spans 21a-21n could comprise standard single mode fiber (SMF), dispersion-shifted fiber (DSF), non-zero dispersion-shifted fiber (NZDSF), a dispersion compensating fiber (DCF), or another fiber type or combination of fiber types.

Two or more spans 21 of communication medium 20 can collectively form an optical link. In the illustrated example, communication medium 20 includes a single optical link comprising numerous spans 21a-21n. System 10 could include any number of additional links each including any suitable number of spans 21. For example, the illustrated optical link could comprise one optical link of a multiple link system, where each link is coupled to other links through optical regenerators.

In the illustrated embodiment, system 10 comprises an optical system that communicates signal 16 over a link distance 30. In various embodiments, link distance 30 can comprise a distance up to 500 kilometers, 800 kilometers, 1200 kilometers, 1500 kilometers, or any other suitable distance.

Booster amplifier 18 is coupled to combiner 14 and communication medium 20. Booster amplifier 18 is operable to receive and amplify wavelengths of signal 16 in preparation for transmission over communication medium 20. Where communication system 10 includes a plurality of fiber spans 21a-21n, one or more in-line amplifiers 22a-22n couple to one or more spans 21a-21n and operate to amplify signal 16 as it traverses communication medium 20. Preamplifier 24 is coupled to communication medium 20 and separator 26. Preamplifier 24 is operable to amplify signal 16 received from a final fiber span 21n. Although terminal 11 is shown to include one or more booster amplifiers 18 and terminal 13 is shown to include one or more preamplifiers 24, one or more of the amplifier types could be eliminated in other embodiments. Alternatively, booster amplifier 18 and/or pre-amplifier 24 could reside external to terminals 11 and 13.

In this document, the term "amplifier" may denote a device or combination of devices operable to at least partially compensate for at least some of the losses incurred by signals while traversing all or a portion of an optical link. Also, the term "amplification" may refer to offsetting at least a portion of losses that would otherwise be incurred. An amplifier may or may not impart a net gain to a signal being amplified. In addition, the term "gain" may or may not require a net gain. In other words, a signal experiencing "gain" or "amplification" in an amplifier stage may, but need not, experience enough gain to overcome all losses in the amplifier stage. As a specific example, distributed Raman amplifier stages may not experience enough gain to offset all of the losses in the transmission fiber that serves as a gain medium. Nevertheless, these devices are considered "amplifiers" because they offset at least a portion of the losses experienced in the transmission filter.

Amplifiers 18, 22, and 24 could each comprise, for example, a discrete Raman amplifier, a distributed Raman amplifier, a rare earth doped amplifier such as an erbium doped or thulium doped amplifier, a semiconductor amplifier, or a combination of these or other amplifier types.

In some cases, multiple wavelength signal 16 can carry wavelength signals 15a-15n ranging across a relatively wide bandwidth. In some implementations, wavelength signals 15a-15n may even range across different communications bands (e.g., the short band (S-band), the conventional band (C-band), and/or the long band (L-band)). Depending on the amplifier types chosen, one or more of amplifiers 18, 22, and/or 24 could comprise a wide band amplifier operable to amplify all signal wavelengths 15a-15n received.

Alternatively, one or more of those amplifiers could comprise a parallel combination of narrower band amplifier assemblies, wherein each amplifier in the parallel combination is operable to amplify a portion of the wavelengths of multiple wavelength signal 16. In that case, system 10 could incorporate signal separators and/or signal combiners surrounding the parallel combinations of amplifier assemblies to facilitate amplification of a plurality of wavelength groups of wavelengths prior to combining or recombining the wavelengths for communication through system 10.

As a particular example, if signal 16 has a bandwidth of 100 nanometers, preamplifier 24 could comprise one first-stage amplifier and three second-stage amplifiers. The first-stage amplifier could amplify and split signal 16 into three bands each having a 34 nanometer bandwidth. Each second-stage amplifier could receive one of the 34 nanometer signals, amplify the signal, and perform optical dispersion compensation on the 34 nanometer signal. Other embodiments of amplifier designs, such as those using a different number of second-stage amplifiers, may be used without departing from the scope of this disclosure.

Separator 26 is coupled to preamplifier 24 and transponders 28. Separator 26 is operable to separate individual optical signals 15a-15n from multiple wavelength signal 16. Separator 26 can communicate individual signal wavelengths 15 or ranges of wavelengths 15 to transponders 28 and/or other optical communication paths. Separator 26 may comprise, for example, a wavelength division demultiplexer (WDM). In one embodiment, the wavelength division demultiplexer may include equipment operable to process wavelength division multiplexed signals and/or equipment operable to process dense wavelength division multiplexed signals.

System 10 may further include one or more access elements. For example, the access element could comprise an optical add/drop multiplexer, a cross-connect, or another device operable to terminate, cross-connect, switch, route, process, and/or provide access to and from the optical link and another optical link or communication device. These access elements may, for example, be coupled between spans 21 of communication medium 20. System 10 may also include one or more lossy elements coupled between spans 21 of the optical link. For example, the lossy element could comprise an isolator, a dispersion compensating element, or a gain equalizer.

In this or other embodiments, system 10 may implement one or more dispersion management techniques to compensate for dispersion of signal 16. For example, system 10 can implement a pre-compensation, an in-line compensation, and/or a post-compensation technique. As a particular example, system 10 could implement an in-line optical dispersion compensation technique in at least a portion of communication link 20 and an electronic dispersion compensation technique in terminals 11 and/or 13. Optical dispersion compensation may involve processing and altering an optical signal, such as signal 16 communicated along communication medium 20. For example, the dispersion compensating element in communication medium 20 may implement one or more optical dispersion compensation techniques to help reduce dispersion of signal 16 as signal 16 traverses communication medium 20. Electronic dispersion compensation may involve processing and altering electrical signals, such as electrical signals used by transponders 12 to produce signals 15 at terminal 11 and/or electrical signals generated by transponders 28 using signals 15 at terminal 13.

Although FIG. 1 illustrates one example of a system 10 for dispersion compensation, various changes may be made to FIG. 1 without departing from the scope of this disclosure. For example, system 10 may include any suitable number of transponders 12, transponders 28, spans 21, in-line amplifiers 22, and/or other components of system 10. Also, system 10 may facilitate unidirectional or bi-directional communication between terminals 11 and 13. In addition, various components in terminals 11 and 13 may reside external to terminals 11 and 13.

Figures 2, 3:
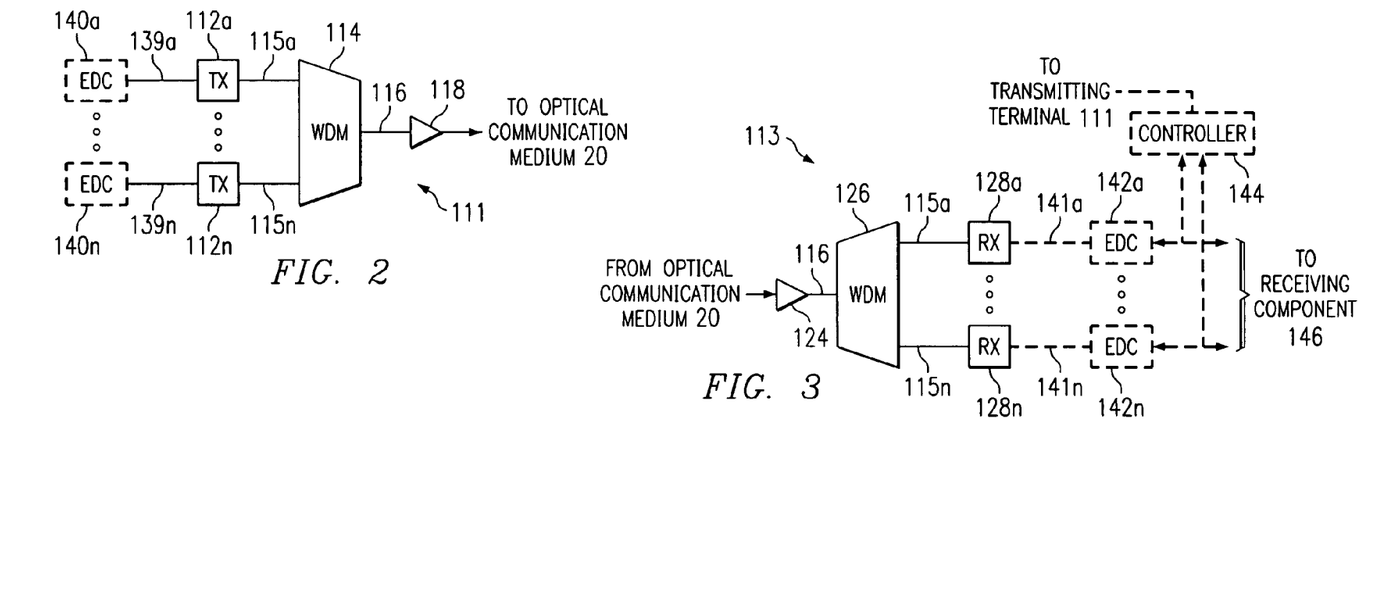
FIG. 2 is a block diagram illustrating an example transmitting terminal.
FIG. 3 is a block diagram illustrating an example receiving terminal.

FIG. 2 is a block diagram illustrating an example transmitting terminal 111. Terminal 111 may, for example, be useful in system 10 of FIG. 1 as terminal 11. In the illustrated embodiment, terminal 111 includes one or more transponders 112a-112n, a combiner 114, a booster amplifier 118, and one or more electronic dispersion compensation (EDC) modules 140a-140n. Other embodiments of terminal 111 may be used without departing from the scope of this disclosure.

Transponders 112a-112n, combiner 114, and booster amplifier 118 may be the same as or similar to transponders 12a-12n, combiner 14, and booster amplifier 18, respectively, of FIG. 1. In the illustrated embodiment, transponders 112a-112n include transmitters operable to receive electrical signals 139a-139n, generate optical signals 115a-115n, and communicate optical signals 115a-115n to combiner 114. Combiner 114 is operable to receive the signals 115a-115n and combine the signals into a multiple wavelength signal 116. Booster amplifier 118 is operable to receive the signal 116, amplify the signal 116, and communicate the signal 116 over communication medium 20.

In one embodiment, one or more channels of signal 116 may suffer from dispersion as they travel from transmitting terminal 111 to a receiving terminal, such as terminal 13 of FIG. 1. The dispersion causes the pulses to broaden, causing inter-symbol interference and a degradation in the Q-factor of system 10.

In one embodiment, system 10 may use one or more dispersion compensation techniques to at least partially offset or correct the dispersion of the optical signal 116. In a particular embodiment, system 10 may implement one or more in-line optical dispersion compensation techniques in at least a portion of communication medium 20. In various embodiments, system 10 could implement an optical dispersion compensation technique at one or more amplifiers within the system. As a particular example, one or more amplifiers could implement dispersion compensating fiber as all or a portion of the gain medium for the amplifier or a stage of the amplifier. The amplification stage implementing the dispersion compensating fiber as a gain medium could comprise a discrete amplification stage, such as a rare earth doped, Raman, or semiconductor amplifier stage. Alternatively, or in addition, a distributed amplifier, such as a distributed Raman amplification stage could implement dispersion compensating fiber as at least a portion of its gain medium.

As another particular example, system 10 could include chirped or Fiber Bragg grating in or near an in-line amplifier 22. The chirped or Fiber Bragg grating may have characteristic variations, such as linear or quadric variations, in the grating period of the fiber. As yet another particular example, system 10 could include a Gires-Tournois interferometer having one totally or substantially reflecting mirror. As still another particular example, system 10 could include a virtually imaged phased array, which includes a semi-cylindrical lens and a glass plate having different reflection coatings. Other optical dispersion compensation techniques, such as the use of higher-order mode optical fibers, may be used without departing from the scope of this disclosure. Also, the optical dispersion compensation technique or techniques used by system 10 could occur in one or multiple stages. For example, multiple stages could be used, where each stage processes a subset of the wavelengths in signal 116.

The optical dispersion compensation technique or techniques used in communication medium 20 may or may not completely offset or correct the effects of the dispersion of signal 116. For example, if system 10 includes multiple spans 21 of optical fiber and multiple in-line amplifiers 22, system 10 may perform optical dispersion compensation at some or all of the in-line amplifiers 22 but may not provide a desired level of compensation. The dispersion of signal 116 at the receiving terminal that was not reduced or will not be reduced by the desired amount using only optical dispersion compensation elements may be referred to as "residual dispersion."

In one embodiment, transmitting terminal 111 includes one or more electronic dispersion compensation modules 140a-140n. In a particular embodiment, transmitting terminal 111 includes one electronic dispersion compensation module 140 for each transponder 112. Electronic dispersion compensation module 140 implements one or more electronic dispersion compensation techniques to help reduce or eliminate residual dispersion in signal 116. Electronic dispersion compensation module 140 may implement any suitable electronic dispersion compensation technique or techniques. For example, electronic dispersion compensation module 140 could include a feed-forward equalizer. A feed-forward equalizer could use a transversal filter having weighted taps. Electronic dispersion compensation module 140 would delay bits in an electrical signal 139, multiply different bit taps by different weights, and sum the weighted taps. As another example, electronic dispersion compensation module 140 could include a decision feedback equalizer. A decision feedback equalizer could use a difference amplifier that compares an input electrical signal 139 and a signal from an automatic gain controller. The output of the difference amplifier is processed by a quantizer that supplies an output signal to a feedback filter, which then supplies a signal to the automatic gain controller. As yet another example, electronic dispersion compensation module 140 could include a combination of a feed-forward equalizer followed by a decision feedback equalizer. Other electronic dispersion compensation techniques may be used by electronic dispersion compensation modules 140 without departing from the scope of this disclosure.

In one aspect of operation, electronic dispersion compensation modules 140 may operate to reduce or eliminate residual dispersion in system 10. As explained above, the optical dispersion compensation technique or techniques used in communication medium 20 may not completely correct the dispersion of signal 116. As a result, even with the use of optical dispersion compensation, signal 116 may be experiencing dispersion by the time it reaches the receiving terminal. In this embodiment, electronic dispersion compensation modules 140 may bias or alter the electrical signals 139 sent to transponders 112 in order to compensate for some or all of the residual dispersion in signal 116. For example, electronic dispersion compensation modules 140 could alter one or more of the electrical signals 139 so that some transponders 112 generate optical signals 115 with, for example, a pre-chirp opposite to that induced by the transmission fiber in communication link 20. This helps to counter the effects of the dispersion in the transmission fiber. Electronic dispersion compensation modules 140 could alter the electrical signals 139 in other ways to compensate for the dispersion without departing from the scope of this disclosure. In this way, electronic dispersion compensation modules 140 may "pre-compensate" for the dispersion suffered by signal 116. In other words, electronic dispersion compensation modules 140 operate to modify signals 115 before the dispersion occurs in communication medium 20.

Electronic dispersion compensation modules 140 may pre-compensate for dispersion in any suitable manner. For example, in one embodiment, electronic dispersion compensation modules 140 may receive information from the receiving terminal, such as a feedback or control signal, that is associated with the residual dispersion of signal 116. As a particular example, the feedback signal may identify the amount of residual dispersion in signal 116. Electronic dispersion compensation modules 140 may then bias or alter one or more of the electrical signals 139 sent to transponders 112 to correct for the measured amount of dispersion. In another embodiment, terminal 111 may be in bi-directional communication with another terminal, such as terminal 13. Terminal 111 may measure the amount of residual dispersion in the signal 116 received from terminal 13, and electronic dispersion compensation modules 140 may then use that figure to alter signals 115 communicated to terminal 13. Other techniques may be used by terminal 111 without departing from the scope of this disclosure.

By pre-compensating for dispersion in system 10, electronic dispersion compensation modules 140 may help to reduce or eliminate the residual dispersion in system 10. This may also provide a dynamic way of compensating for dispersion. For example, the amount of dispersion caused by the optical fiber in spans 21 may vary depending on the temperature of the optical fiber, the types of optical fiber used, the lengths of the optical fibers, the bit rate of the signals 115, and/or any other of a wide variety of factors. By allowing at least one of the terminals to identify the amount of residual dispersion in signal 116 and having transmitting terminal 111 take steps to pre-compensate for that residual dispersion, system 10 may reduce the amount of dispersion dynamically. This may allow system 10 to reduce the amount of dispersion caused by the fiber in spans 21, even when the amount of dispersion varies over time.

Although FIG. 2 illustrates one example of a transmitting terminal 111, various changes may be made to terminal 111 without departing from the scope of this disclosure. For example, terminal 111 may include any suitable number of transponders 112 and/or electronic dispersion compensation modules 140. Also, various components of terminal 111, such as combiner 114 and/or booster amplifier 118, could reside outside of terminal 111. In addition, terminal 111 need not include electronic dispersion compensation modules 140. In another embodiment, the electronic dispersion compensation could occur in another location, such as at the receiving terminal.

FIG. 3 is a block diagram illustrating an example receiving terminal 113. Terminal 113 may, for example, be useful in system 10 of FIG. 1 as terminal 13. In the illustrated embodiment, terminal 113 includes a preamplifier 124, a separator 126, one or more transponders 128a-128n, one or more electronic dispersion compensation (EDC) modules 142a-142n, and a controller 144. Other embodiments of terminal 113 may be used without departing from the scope of this disclosure.

Preamplifier 124, separator 126, and transponders 128a-128n may be the same as or similar to preamplifier 24, separator 26, and transponders 28a-28n, respectively, of FIG. 1. In the illustrated embodiment, preamplifier 124 is operable to receive a signal 116 from communication medium 20, amplify the signal 116, and communicate the signal 116 to separator 126. Separator 126 is operable to receive signal 116 and separate signal 116 into signals 115a-115n. Transponders 128a-128n include receivers operable to receive signals 115a-115n and generate electrical signals 141a-141n corresponding to the optical signals 115a-115n.

In one embodiment, receiving terminal 113 includes one or more electronic dispersion compensation modules 142a-142n. In a particular embodiment, receiving terminal 113 includes one electronic dispersion compensation module 142 for each transponder 128. Electronic dispersion compensation modules 142 may be the same as or similar to electronic dispersion compensation modules 140 of FIG. 2.

In one aspect of operation, electronic dispersion compensation modules 142 may implement one or more electronic dispersion compensation techniques to help reduce or eliminate residual dispersion in signal 116. In this embodiment, electronic dispersion compensation modules 142 may bias or alter the electrical signals 141 produced by transponders 128 in order to compensate for any residual dispersion in signal 116. For example, signal 116 may have suffered from dispersion such that optical signal 115a experiences pulse broadening. In this way, electronic dispersion compensation modules 142 may "post-compensate" for the pulse broadening experienced by signal 116. In other words, electronic dispersion compensation modules 142 operate to modify signals in system 10 after dispersion has occurred in communication medium 20.

By post-compensating for dispersion in system 10, electronic dispersion compensation modules 142 may help to reduce or eliminate the residual dispersion in system 10. This may also provide a dynamic way of compensating for dispersion. By having terminal 113 identify the amount of residual dispersion in signal 116 and take steps to post-compensate for that residual dispersion, system 10 may reduce the amount of dispersion dynamically. This may allow system 10 to reduce the amount of dispersion caused by the fiber in spans 21, even when the amount of dispersion varies over time.

In this example, controller 144 is coupled to electronic dispersion compensation modules 142. Controller 144 is operable to measure the amount of residual dispersion at terminal 113. For example, controller 144 may communicate with electronic dispersion compensation modules 142 and identify any residual dispersion in electrical signals 141a-141n. Controller 144 may then communicate with transmitting terminal 111, such as by informing transmitting terminal 111 of the identified amount of residual dispersion. In this embodiment, transmitting terminal 111 may then take any suitable action, such as having electronic dispersion compensation modules 140a-140n pre-compensate for the identified amount of residual dispersion. Controller 144 could also communicate the control signals to electronic dispersion compensation modules 142, which may use the control signals to post-compensate for the identified amount of residual dispersion. Controller 144 could further communicate with an adjustable or tunable optical dispersion compensation element in communication medium 20, and the optical dispersion compensation element could use the control signals to provide optical dispersion compensation. Although FIG. 3 illustrates one controller 144 in terminal 113, any suitable number of controllers 144 may be used. For example, terminal 113 could include one controller 144 for each transponder 128 or subset of transponders 128. Also, in another embodiment, terminal 113 could lack electronic dispersion compensation modules 142, and controller 144 could be coupled to transponders 128. In this embodiment, controller 144 could measure the amount of residual dispersion at terminal 113, inform terminal 111 of the dispersion, and allow terminal 111 to perform the electronic dispersion compensation.

Although FIG. 3 illustrates one example of a receiving terminal 113, various changes may be made to terminal 113 without departing from the scope of this disclosure. For example, terminal 113 may include any suitable number of transponders 128 and/or electronic dispersion compensation modules 142. Also, various components of terminal 113, such as preamplifier 124 and/or separator 126, could reside outside of terminal 113. Further, terminal 113 need not include electronic dispersion compensation modules 142 and/or controller 144. In another embodiment, the electronic dispersion compensation could occur in another location, such as at the transmitting terminal 111, and electronic dispersion compensation modules 142 need not be included in terminal 113. In yet another embodiment, the electronic dispersion compensation could occur only at terminal 113 or in a way that does not require feedback, and controller 144 could be omitted from terminal 113.

In addition, FIGS. 2 and 3 illustrate two separate end terminals 111 and 113. In one embodiment, a single terminal could implement the functionality of both terminals 111 and 113. For example, the combined terminal could include transponders 112 and/or 128, combiner 114, booster amplifier 118, preamplifier 124, and separator 126. The combined terminal could also include one or both of electronic dispersion compensation modules 140 and 142.

Figure 4:
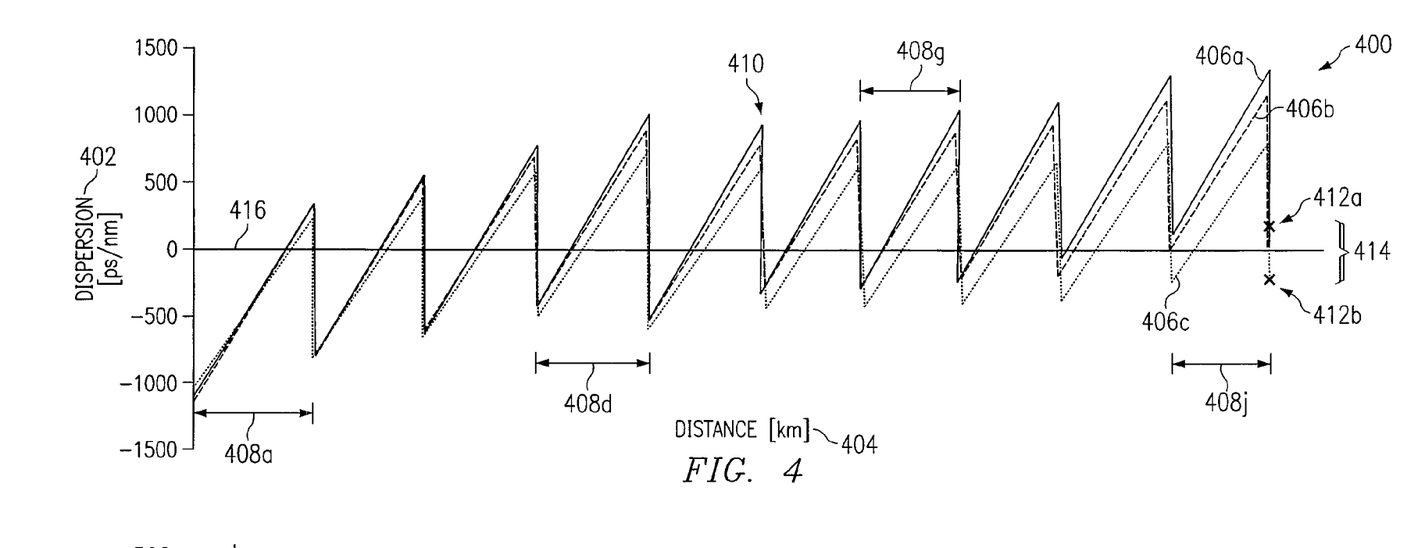
FIG. 4 is a diagram illustrating dispersion in a communication system.

FIG. 4 is a diagram illustrating an example dispersion pattern 400 of optical signals in a communication system. In particular, FIG. 4 illustrates how the dispersion 402 of three optical signals 406a-406c of 1523 nanometers, 1510 nanometers, and 1493 nanometers, respectively, varies over distance 404. In this example, each sloped region represents dispersion caused by the transmission fiber in a span 21, while each abrupt step-down represents the use of a dispersion compensating fiber or other dispersion compensating element in communication medium 20. The information contained in FIG. 4 is for illustration only. For example, while FIG. 4 illustrates the dispersion 402 experienced by three optical signals 406 having a bandwidth of 30 nanometers, any other suitable signals having any other suitable bandwidth may be used.

In the illustrated example, the dispersion 402 of optical signals 406 increases during each of a plurality of distance windows 408, and the dispersion 402 decreases at the end 410 of each window 408. In this example, each window 408 may correspond to one span 21 of optical fiber in communication medium 20. As shown in FIG. 4, the dispersion 402 of the optical signals 406 increases during each window 408. At the end of each span 21 of optical fiber, one or more optical dispersion compensation techniques may be implemented in communication medium 20. As a particular example, a dispersion compensating fiber may be used at or near an in-line amplifier 22 in communication medium 20, which helps to reduce the dispersion 402 experienced by optical signals 406. As a result, the dispersion 402 suffered by optical signals 406 typically decreases at the end 410 of each window 408.

It may be very difficult to accurately compensate for dispersion in all wavelengths using only optical dispersion compensation. As particular examples, communication medium 20 could have a link distance of 1500 kilometers. Signal 16 could be a 10 GHz signal having a bandwidth of 0.1 nanometers. The amount of residual dispersion at the receiving terminal could then be defined by dividing the amount of allowable broadening of signal 16 by the product of the bandwidth of signal 16 and the link distance 30. For example, if signal 16 could be allowed to broaden by 5 picoseconds, the residual dispersion would equal approximately 0.03 picoseconds per nanometer kilometer. If signal 16 could be allowed to broaden by 8 picoseconds, the residual dispersion would equal approximately 0.05 picoseconds per nanometer kilometer.

As shown in FIG. 4, the optical dispersion compensation technique or techniques used in communication medium 20 may not completely eliminate dispersion 402 of optical signals 406. For example, at the beginning of window 408d, there is some dispersion 402 of optical signals 406. At the end of window 408d, there is a much larger amount of dispersion 402 of optical signals 406. The end 410 of window 408d illustrates the effects of the optical dispersion compensation technique used in communication medium 20, which decreases the dispersion 402 of optical signals 406. However, as shown at the end 410 of window 408d, optical signals 406 still suffer from some measure of dispersion 402, even after undergoing optical dispersion compensation. As shown in FIG. 4, the dispersion 402 of optical signals 406 continues to increase as the distance 404 increases, even though one or more optical dispersion compensation techniques are being used in communication medium 20.

Despite having used one or more optical dispersion compensation techniques in communication medium 20, some residual dispersion 414 remains in system 10. This is illustrated in FIG. 4, where optical signal 406a has a dispersion identified by point 412a, and optical signal 406c has a dispersion identified by point 412b. Ideally, if the optical dispersion compensation technique used in communication medium 20 eliminated all dispersion 402 of optical signals 406, points 412a and 412b would both lie on line 416. This would indicate that no dispersion 402 affects optical signals 406. However, as shown in FIG. 4, points 412a and 412b lie apart from one another and actually lie on opposite sides of line 416. This indicates that at least some of the signals 406 experienced some amount of pulse broadening, and therefore some amount of residual dispersion remains in system 10. In one embodiment, the amount of residual dispersion can vary depending on the wavelength of the signal 406.

To compensate for the residual dispersion 414 that effects optical signals 406, system 10 may use one of more electronic dispersion compensation techniques. For example, signals 406 may suffer from pulse broadening, and system 10 uses one or more electronic dispersion compensation techniques to narrow the pulses in time to help avoid inter-symbol interference and a degradation in time. As a particular example, electronic dispersion compensation modules 140 in transmitting terminal 111 could alter the electrical signals 139 sent to transponders 112 such that transponders 112 generate optical signals 115 with a pre-chirp opposite to that induced by the transmission fiber in communication link 20. Similarly, electronic dispersion compensation modules 142 in receiving terminal 113 could process the electrical signals 141 generated by transponders 128 and alter the electrical signals 141 to correct for the residual dispersion 414. For example, electronic dispersion compensation modules 142 could post-compensate for any pulse broadening experienced by signal 116.

In a particular embodiment, terminal 111 may generate and communicate a signal 116 to terminal 113. A controller 144 in terminal 113 may measure the amount of residual dispersion 414 in signal 116 and communicate the measured amount of residual dispersion 414 back to terminal 111. Electronic dispersion compensation modules 140 in terminal 111 may then alter electrical signals 139 to compensate for the measured amount of residual dispersion 414, generate a new signal 116, and communicate the new signal 116 to receiving terminal 113. If some amount of residual dispersion 414 still exists in the new signal 116, electronic dispersion compensation modules 142 in terminal 113 may correct for the remaining residual dispersion 414. Controller 144 could then communicate with terminal 111 and attempt to reduce the remaining amount of residual dispersion 414.

Although FIG. 4 illustrates one example of the dispersion pattern 400 of optical signals 406, various changes may be made to FIG. 4 without departing from the scope of this disclosure. For example, any suitable number of spans 21 corresponding to windows 408 may be used in system 10. Also, optical dispersion compensation may but need not be performed at the end of each span 21.

Figure 5:
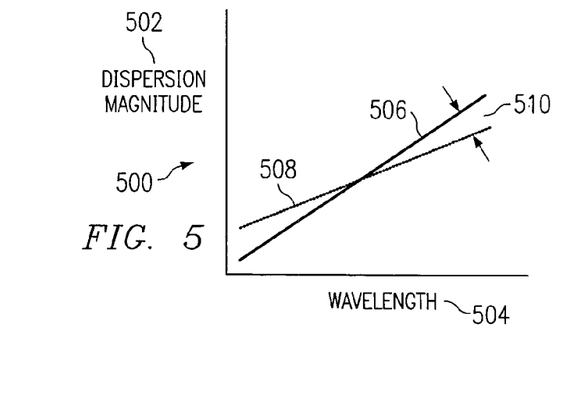
FIG. 5 is a diagram illustrating residual dispersion in a communication system.

FIG. 5 is a diagram illustrating a dispersion compensation mismatch 500 in a communication system. In particular, FIG. 5 illustrates how the magnitude of dispersion 502 may vary according to the wavelength 504 of an optical signal. The information contained in FIG. 5 is for illustration only. Any other dispersion-wavelength relationships may be used without departing from the scope of this disclosure.

In the illustrated example, line 506 is associated with a span 21 of optical fiber in communication medium 20, and line 508 is associated with a dispersion compensating fiber or other dispersion compensating element used at or near an in-line amplifier 22 in communication medium 20. In this example, optical signals traveling through the span 21 of optical fiber suffer from some amount of dispersion 502. This is shown in FIG. 5, where line 506 indicates that the dispersion 502 of the optical signals varies according to the wavelength 504 of the optical signals.

The dispersion 502 suffered by the optical signals may be at least partially counteracted or reversed through the use of dispersion compensating fiber or other dispersion compensating element at or near an in-line amplifier 22. For example, optical signals that travel faster in the span 21 would travel slower in the dispersion compensating fiber, while optical signals that traveled slower in the span 21 would travel faster in the dispersion compensating fiber. This is also shown in FIG. 5, where line 508 indicates that the dispersion 502 of the optical signals varies according to the wavelength 504 of the optical signals.

Because FIG. 5 illustrates how the magnitude of the dispersion 502 varies over distance 504, both lines 506 and 508 are shown to have a positive slope. If the actual dispersion 502, rather than the magnitude of dispersion 502, was plotted over distance 504, one of the lines 506, 508 would have a positive slope while the other line 506, 508 would have a negative slope.

Ideally, line 506 associated with span 21 and line 508 associated with the dispersion compensating fiber would completely overlap. This would indicate that the amount of dispersion 502 suffered by optical signals in the span 21 would be completely eliminated by an opposite amount of dispersion 502 in the dispersion compensating fiber or other optical dispersion compensating element. However, as shown in FIG. 5, lines 506 and 508 do not overlap completely. Instead, there is a mismatch between the dispersion slopes. In this document, the phrase "dispersion slope mismatch" refers to a mismatch between the dispersion caused by the transmission fiber in a span 21 and the dispersion caused by a dispersion compensating element. If, for any given wavelength, the dispersion caused by span 21 is different than the dispersion caused by a dispersion compensating element, a "dispersion slope mismatch" exists. As a result, even after the optical signals have passed through the dispersion compensating fiber, some amount of residual dispersion 510 would still remain in the optical signals. In short, it is very difficult to accurately compensate for dispersion in all wavelengths using only optical dispersion compensating techniques. This provides one possible explanation as to why, at the end 410 of each window 408 in FIG. 4, some amount of dispersion 402 could still remain in optical signals 406. Because of this, at the end of communication link 20, there is some residual dispersion experienced by the optical signals.

In one embodiment, the use of electronic dispersion compensation in terminals 111 and/or 113 helps to compensate for the mismatch between the dispersion in the span 21 and the dispersion in the optical dispersion compensating element. For example, electronic dispersion compensation modules 140 and/or 142 could alter electrical signals 139 and/or 141 to compensate for the dispersion that remains in the optical signals because of the mismatch.

Although FIG. 5 illustrates one example of a dispersion compensation mismatch 500, various changes may be made to FIG. 5 without departing from the scope of this disclosure. For example, the dispersion-wavelength relationships shown in FIG. 5 are for illustration only. Any other suitable relationships may be used without departing from the scope of this disclosure.

Figure 6:
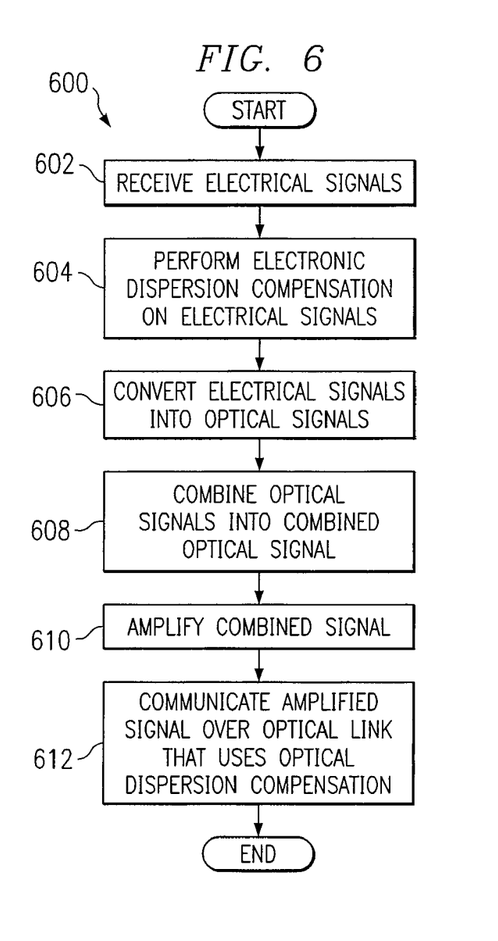
FIG. 6 is a flow diagram illustrating an example method for dispersion compensation at a receiving end terminal.

FIG. 6 is a flow diagram illustrating an example method for dispersion compensation at a transmitting terminal. Although in this example method 600 is described with respect to transmitting terminal 111 of FIG. 2, other terminal designs can be used without departing from the scope of this disclosure.

Terminal 111 receives electrical signals 139 at step 602. This may include, for example, terminal 111 receiving the electrical signals 139 from any suitable source, such as a source desiring to initiate communication over communication medium 20. Terminal 111 performs electronic dispersion compensation on the electrical signals 139 at step 604. This may include, for example, electronic dispersion compensation modules 140a-140n processing and altering electrical signals 139. In a particular embodiment, electronic dispersion compensation modules 140 may process electrical signals 139 using feedback signals received from a receiving terminal, such as terminal 113 of FIG. 3.

Terminal 111 converts the electrical signals 139 into optical signals 115 at step 606. This may include, for example, transponders 112a-112n receiving electrical signals 139a-139n and generating optical signals 115a-115n. Terminal 111 combines optical signals 115 into a combined optical signal 116 at step 608. This may include, for example, a combiner 114 combining the optical signals 115 onto a multiple wavelength signal 116. Terminal 111 amplifies the combined signal 116 at step 610. This may include, for example, booster amplifier 118 amplifying signal 116. Terminal 111 communicates the amplified signal 116 over an optical link. This may include, for example, booster amplifier 118 communicating the amplified signal 116 over optical communication medium 20. In a particular embodiment, optical communication medium 20 implements one or more optical dispersion compensation techniques at one or more points, such as at or near one or more in-line amplifiers 22.

Although FIG. 6 illustrates one example of a method 600 for dispersion compensation at a transmitting terminal 111, various changes may be made to method 600 without departing from the scope of this disclosure. For example, transmitting terminal 111 need not perform electronic dispersion compensation at step 604. In another embodiment, the electronic dispersion compensation may be implemented at another point in system 10, such as at the receiving terminal. Also, terminal 111 may but need not amplify the combined signal 116 at step 610.

Figure 7:
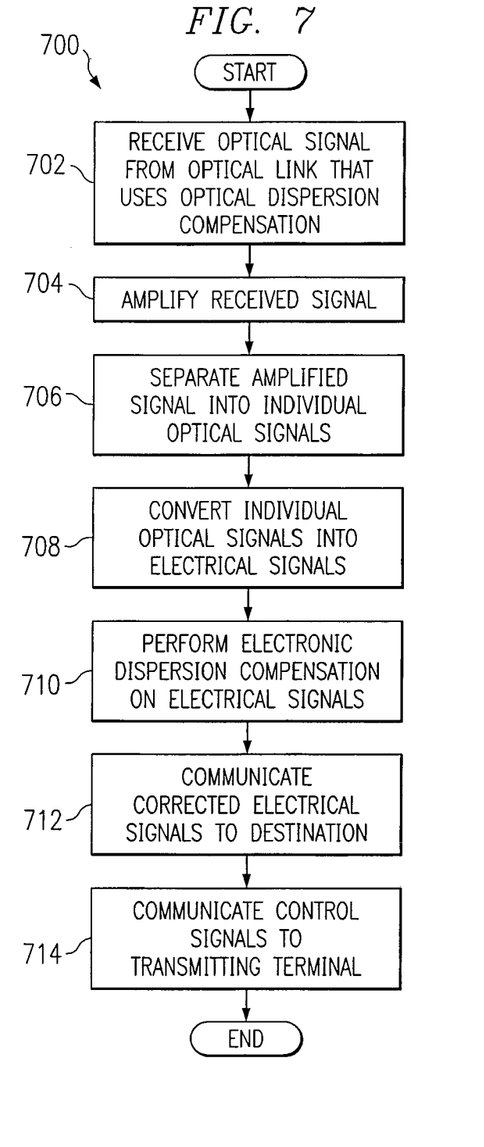
FIG. 7 is a flow diagram illustrating an example method for dispersion compensation at a transmitting end terminal.

FIG. 7 is a flow diagram illustrating an example method 700 for dispersion compensation at a receiving terminal. Method 700 may be described with respect to receiving terminal 113 of FIG. 3. Other receiving terminals may be used without departing from the scope of this disclosure.

Terminal 113 receives an optical signal 116 at step 702. This may include, for example, terminal 113 receiving the optical signal 116 from a communication medium 20 that implements one or more optical dispersion compensation techniques. Terminal 113 amplifies the received signal 116 at step 704. This may include, for example, preamplifier 124 amplifying the received signal 116. Terminal 113 separates the amplified signal 116 into individual optical signals 115a-115n at step 706. This may include, for example, separator 126 dividing the optical signal 116 into a plurality of optical signals 115. Terminal 113 converts the individual optical signals 115 into electrical signals 141 at step 708. This may include, for example, transponders 128 receiving the optical signals 115 and converting the optical signals 115 into electrical signals 141.

Terminal 113 performs electronic dispersion compensation on the electrical signals 141 at step 710. This may include, for example, electronic dispersion compensation modules 142a-142n altering electrical signals 141 to correct for any residual dispersion. Terminal 113 communicates the corrected electrical signals 141 to a destination at step 712. This may include, for example, electronic dispersion compensation modules 142 communicating the electrical signals 141 to a receiving component 146. Terminal 113 communicates control signals to a transmitting terminal at step 714. This may include, for example, controller 144 identifying the amount of residual dispersion that exists in optical signal 116 and communicating the measured amount of dispersion to transmitting terminal 111. This may allow, for example, electronic dispersion compensation modules 140 in transmitting terminal 111 to pre-compensate for the measured amount of residual dispersion.

Although FIG. 7 illustrates one example of a method 700 for dispersion compensation at a receiving terminal 113, various changes may be made to method 700 without departing from the scope of this disclosure. For example, terminal 113 may but need not amplify the received signal 116 at step 704. Also, terminal 113 may but need not perform electronic dispersion compensation at step 710. In another embodiment, electronic dispersion compensation may be performed at another point in system 10, such as at transmitting terminal 111. In addition, terminal 113 may but need not communicate control signals to a transmitting terminal 111 at step 714. In another embodiment, transmitting terminal 111 does not perform electronic dispersion compensation or otherwise has no use for the control signals from controller 144.

Although the present invention has been described with several embodiments, a number of changes, substitutions, variations, alterations, and modifications may be suggested to one skilled in the art, and it is intended that the invention encompass all such changes, substitutions, variations, alterations, and modifications that fall within the spirit and scope of the appended claims.

What is claimed is:

1. An optical communication system, comprising:
    a first transponder operable to receive from a multiple span communication link an optical signal and to convert the optical signal into an electrical signal, the optical signal comprising a plurality of optical signal wavelengths, wherein the optical signal experiences at least partial dispersion compensation from an optical dispersion compensating element as it traverses the communication link;
    an electronic dispersion compensation module coupled to the transponder, the electronic dispersion compensation module operable to provide electronic dispersion compensation to at least a portion of the electrical signal to at least partially compensate for at least a portion of a residual dispersion for which the optical dispersion compensating element did not compensate; and
    a controller coupled to the electronic dispersion compensation module, the controller operable to generate at least one control signal identifying an amount of residual dispersion in the electrical signal for which the electronic dispersion compensation module did not compensate, to communicate the control signal to the electronic dispersion compensation module, to generate a feedback signal identifying the amount of residual dispersion in the electrical signal for which the electronic dispersion compensation module did not compensate, and to communicate the feedback signal to a second transponder, the second transponder operable to generate the optical signal received by the first transponder based at least in part on the feedback signal, and wherein the electronic dispersion compensation module uses the control signal to post-compensate for the amount of residual dispersion in the optical signal.

2. The system of claim 1, wherein the electronic dispersion compensation module resides in a receiving terminal operable to receive the optical signal.

3. The system of claim 1, wherein the transponder comprises one of a plurality of transponders operable to receive a plurality of optical signals and generate a plurality of electrical signals, the plurality of optical signals comprising the multiple wavelength signal.

4. The system of claim 3, wherein at least one electronic dispersion compensation module is coupled to each transponder.

5. The system of claim 2, wherein the receiving terminal further comprises:
    a preamplifier operable to receive the multiple wavelength signal over the communication link and to amplify the multiple wavelength signal; and
    a separator coupled to the preamplifier and the transponders, the separator operable to separate the multiple wavelength signal into the plurality of optical signals.

6. The system of claim 5, wherein the optical dispersion compensating element comprises the preamplifier.

7. The system of claim 1, wherein the optical dispersion compensating element comprises an element selected from a group consisting of a dispersion compensating fiber, a chirped Bragg grating, a Gires-Tournois interferometer, a virtually imaged phased array, and higher-order mode fiber.

8. The system of claim 1, wherein the optical dispersion compensating element comprises a length of dispersion compensating fiber serving as at least a portion of a gain medium in an amplifier coupled to the communication link.

9. The system of claim 8, wherein the length of dispersion compensating fiber comprises at least a portion of a gain medium in a distributed Raman amplification stage.

10. The system of claim 8, wherein the length of dispersion compensating fiber comprises at least a portion of a gain medium in a discrete Raman amplification stage.

11. The system of claim 1, wherein the electronic dispersion compensating module comprises a compensating element selected from a group consisting of a feed-forward equalizer, a decision feedback equalizer and a combination of a feed-forward equalizer and a decision feedback equalizer.

12. The system of claim 1, wherein absent the electronic dispersion compensation, the residual dispersion would be at least 0.05 picoseconds per nanometer kilometer.

13. An optical communication system, comprising:
    an optical dispersion compensation element operable to receive from an optical communication link a multiple wavelength signal and to provide at least partial dispersion compensation to the multiple wavelength signal so that a dispersion of the multiple wavelength signal does not exceed a threshold dispersion, the multiple wavelength signal experiencing a residual dispersion for which the optical dispersion compensating element does not compensate; and a first electronic dispersion compensation module operable to receive a first electrical signal comprising the residual dispersion for which the optical dispersion compensating element did not compensate, and to provide electronic dispersion compensation to at least partially compensate for the residual dispersion of the multiple wavelength signal for which the optical dispersion compensating element did not compensate;

a controller coupled to the electronic dispersion compensation module, the controller operable to generate at least one control signal identifying an amount of residual dispersion in the electrical signal for which the first electronic dispersion compensation module did not compensate, to communicate the control signal to the first electronic dispersion compensation module, to generate a feedback signal identifying the amount of residual dispersion in the electrical signal for which the first electronic dispersion compensation module did not compensate, and to communicate the feedback signal to a second electronic dispersion compensation module, wherein the first electronic dispersion compensation module uses the control signal to post-compensate for the amount of residual dispersion in the multiple wavelength signal and wherein the second electronic dispersion compensation module uses the feedback signal to pre-compensate for the amount of residual dispersion in the multiple wavelength signal.

14. The system of claim 13, wherein the threshold dispersion equals 0.05 picoseconds per nanometer kilometer.

15. The system of claim 13, wherein the threshold dispersion equals 0.03 picoseconds per nanometer kilometer.

16. A method of communicating optical signals, comprising:

receiving from a multiple span communication link an optical signal, the optical signal comprising a plurality of optical signal wavelengths, wherein the optical signal experiences at least partial dispersion compensation from an optical dispersion compensating element as it traverses the communication link and wherein the optical signal experiences a residual dispersion for which the optical dispersion compensating element does not compensate;

converting the optical signal into an electrical signal;

providing electronic dispersion compensation at an electronic dispersion compensation module to at least a portion of the electrical signal to at least partially compensate for at least a portion of the residual dispersion of the optical signal for which the optical dispersion compensating element did not compensate;

generating at least one control signal identifying an amount of residual dispersion in the electrical signal for which the electronic dispersion compensation module did not compensate;

generating a feedback signal identifying the amount of residual dispersion;

communicating the control signal to the electronic dispersion compensation module; and generating a feedback signal identifying the amount of residual dispersion in the electrical signal for which the electronic dispersion compensation module did not compensate, wherein the optical signal received from the multiple span communication link is generated based at least in part on the feedback signal, wherein the electronic dispersion compensation module uses the control signal to post-compensate for at least a portion of the residual dispersion in the optical signal.

17. The method of claim 16, wherein providing electronic dispersion compensation comprises communicating the electrical signal to a feed forward equalizer.

18. The method of claim 16, wherein providing electronic dispersion compensation comprises communicating the electrical signal to a decision feedback equalizer.

19. The method of claim 16, wherein the optical dispersion compensating element comprises an element selected from a group consisting of a dispersion compensating fiber, a chirped Bragg grating, a Gires-Tournois interferometer, a virtually imaged phased array, and higher-order mode fiber.

20. The method of claim 16, wherein absent the electronic dispersion compensation, the residual dispersion would be at least 0.03 picoseconds per nanometer kilometer.

* * * * *